(12) United States Patent
Ballagh et al.

(10) Patent No.: US 7,437,280 B1
(45) Date of Patent: Oct. 14, 2008

(54) HARDWARE-BASED CO-SIMULATION ON A PLD HAVING AN EMBEDDED PROCESSOR

(75) Inventors: Jonathan B. Ballagh, Longmont, CO (US); L. James Hwang, Menlo Park, CA (US); Roger B. Milne, Boulder, CO (US); Nabeel Shirazi, San Jose, CA (US); Jeffrey D. Stroomer, Lafayette, CO (US)

(73) Assignee: Xilinx, Inc., San Jose, CA (US)

( * ) Notice: Subject to any disclaimer, the term of this patent is extended or adjusted under 35 U.S.C. 154(b) by 572 days.

(21) Appl. No.: 11/016,378

(22) Filed: Dec. 16, 2004

(51) Int. Cl.
*G06F 17/50* (2006.01)

(52) U.S. Cl. .............................. 703/14; 703/13; 703/28; 716/4

(58) Field of Classification Search ................. 703/14, 703/28, 13, 22; 716/18, 3–6
See application file for complete search history.

(56) References Cited

U.S. PATENT DOCUMENTS

| | | | | |
|---|---|---|---|---|
| 5,768,567 A | * | 6/1998 | Klein et al. .................... | 703/13 |
| 5,771,370 A | * | 6/1998 | Klein ........................... | 703/13 |
| 6,178,542 B1 | * | 1/2001 | Dave ............................ | 716/18 |
| 6,212,489 B1 | * | 4/2001 | Klein et al. .................... | 703/13 |
| 6,389,379 B1 | * | 5/2002 | Lin et al. ....................... | 703/14 |
| 7,107,202 B1 | * | 9/2006 | Hegde et al. .................. | 703/22 |
| 7,143,376 B1 | * | 11/2006 | Eccles ........................... | 716/5 |
| 7,194,705 B1 | * | 3/2007 | Deepak et al. ................. | 716/3 |
| 7,203,632 B2 | * | 4/2007 | Milne et al. ................... | 703/14 |

OTHER PUBLICATIONS

Shang et al., L. High-Level Power Modeling of CPLDs and FPGAs, IEEE 2001 Int. Conf. on Computer Design, Sep. 2001, pp. 46-51.*
Guo et al., Z. Design and Simulation of a RISC-based 32-bit Embedded On-Board Computer, IEEE 7th Asian Test Symposium, Dec. 1998, pp. 413-416.*
U.S. Appl. No. 10/850,178, filed May 20, 2004, Ballagh et al.

* cited by examiner

*Primary Examiner*—Russell Frejd
(74) *Attorney, Agent, or Firm*—LeRoy D. Maunu; Lois D. Cartier

(57) ABSTRACT

Co-simulation of an electronic circuit design using an embedded processor on a programmable logic device (PLD). The programmable logic resources of a PLD are used to perform hardware-based co-simulation of a first portion of the electronic circuit design. Software-based co-simulation of a second portion of the electronic circuit design is performed using the embedded processor.

11 Claims, 4 Drawing Sheets

HARDWARE-BASED CO-SIMULATION ON A PLD HAVING AN EMBEDDED PROCESSOR

FIELD OF THE INVENTION

The present invention generally relates to co-simulation of electronic circuit designs.

BACKGROUND

A high level modeling system (HLMS) is a software tool in which electronic designs can be described, simulated, and translated by machine into a design realization. An HLMS provides a higher level of abstraction for describing an electronic circuit than a hardware description language (HDL) simulation environment such as the ModelSim environment from the Model Technology company. An HLMS generally provides a mathematical representation of signals as compared to standard logic vectors in a hardware description language (HDL). It is desirable for the high-level abstractions to be precisely correlated with the ultimate implementation representation, both in simulation semantics and in implementation. The Xilinx System Generator tool for DSP (Sysgen) and the MathWorks' Simulink and MATLAB environments are examples of such HLMSs.

An HLMS for electronic circuit design generally offers abstractions that are not available in traditional HDLs. For example, an HLMS is likely to offer abstractions that relate to signal propagation and signal state, while an HDL may support a detailed representation that more closely models a realized electronic circuit. An electronic design modeled in an HLMS may be viewed as a collection of components that communicate through signals. Signals are discrete, time-varying sequences of values. An HLMS generally provides abstractions to support implementing synchronous designs without requiring the specification of explicit references to clocks or clock signals. Instead of providing a detailed, event driven simulation, an HLMS may also provide abstractions wherein clock-synchronous state changes are scheduled to occur at regular intervals and in which there is no notion of the timing characteristics related to the intended implementation as an electronic circuit. In further support of creating high-level designs, an HLMS may also represent state in terms of numerical (or other abstract) values instead of representing state in a detailed format analogous to standard logic vectors.

An HLMS such as Sysgen also has the capability to generate objects for co-simulation using a hardware platform. Co-simulation generally refers to dividing a design into portions and simulating the portions on two or more platforms. There are different types of platforms on which designs may be co-simulated.

Example co-simulation platforms include both software-based and hardware-based systems. The Modelsim simulator and the NC-SIM simulator from Cadence are example software-based systems, and the Wildcard and Benone hardware-based platforms from Annapolis Microsystems and Nallatech, respectively, are example hardware-based systems. The WildCard and Benone board are often used for algorithm exploration and design prototyping and include programmable logic devices (PLDs). In software-based co-simulations, the user may perform a behavioral simulation or perform simulation using a synthesized and mapped version of the design.

In a hardware-based system, a portion of the design is emulated on a hardware platform that includes a programmable logic device (PLD), such as a field programmable gate array (FPGA). Co-simulating on a hardware platform may be used to reduce the time required for a simulation run. Hardware co-simulation also may be used to support real-time hardware debugging.

In co-simulation involving an HLMS and a hardware-based co-simulation engine, interactions between the HLMS and hardware-based co-simulation engines may introduce significant overhead and thereby significantly reduce simulation performance. The HLMS executing on a host workstation is responsible for controlling the FPGA during hardware co-simulation and does so by issuing control commands, providing input data, and retrieving output data from the hardware-based co-simulation engine. The overhead introduced in issuing commands and transmitting data may be considerable. For example, when the HLMS issues a command to the hardware-based co-simulation engine, a software device driver is called by the HLMS and the command is transmitted across the communication link.

Overhead associated with transactions between the HLMS and hardware-based co-simulation engine may degrade simulation performance. For example, the HLMS communicates with the hardware-based co-simulation engine for each input/output (I/O) event for a block simulated on the hardware-based co-simulation engine and also when the hardware-based co-simulation engine needs to be clocked to synchronize with the HLMS. Each transaction may involve a small amount of data. The combination of a large number of transactions involving small amounts of data may result in a significant portion of the simulation time being spent on the overhead associated with these transactions.

The present invention may address one or more of the above issues.

SUMMARY OF THE INVENTION

The various embodiments of the invention provide co-simulation of an electronic circuit design using an embedded processor on a programmable logic device (PLD). The programmable logic resources of a PLD are used to perform hardware-based co-simulation of a first portion of the electronic circuit design. Software-based co-simulation of a second portion of the electronic circuit design is performed using the embedded processor.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention support co-simulation of a circuit design using a PLD having an embedded processor. A portion of the design is simulated using software-based simulation on the embedded processor, and another portion of the design is simulated using programmable logic resources of the PLD. This approach may significantly reduce the overhead involved in transactions between the software-based and the hardware-based co-simulation. Various other embodiments provide on-PLD buffering of simulation result data and a low-latency interface between the embedded processor and the portion of the design being simulated on PLD logic resources.

Figure 1:
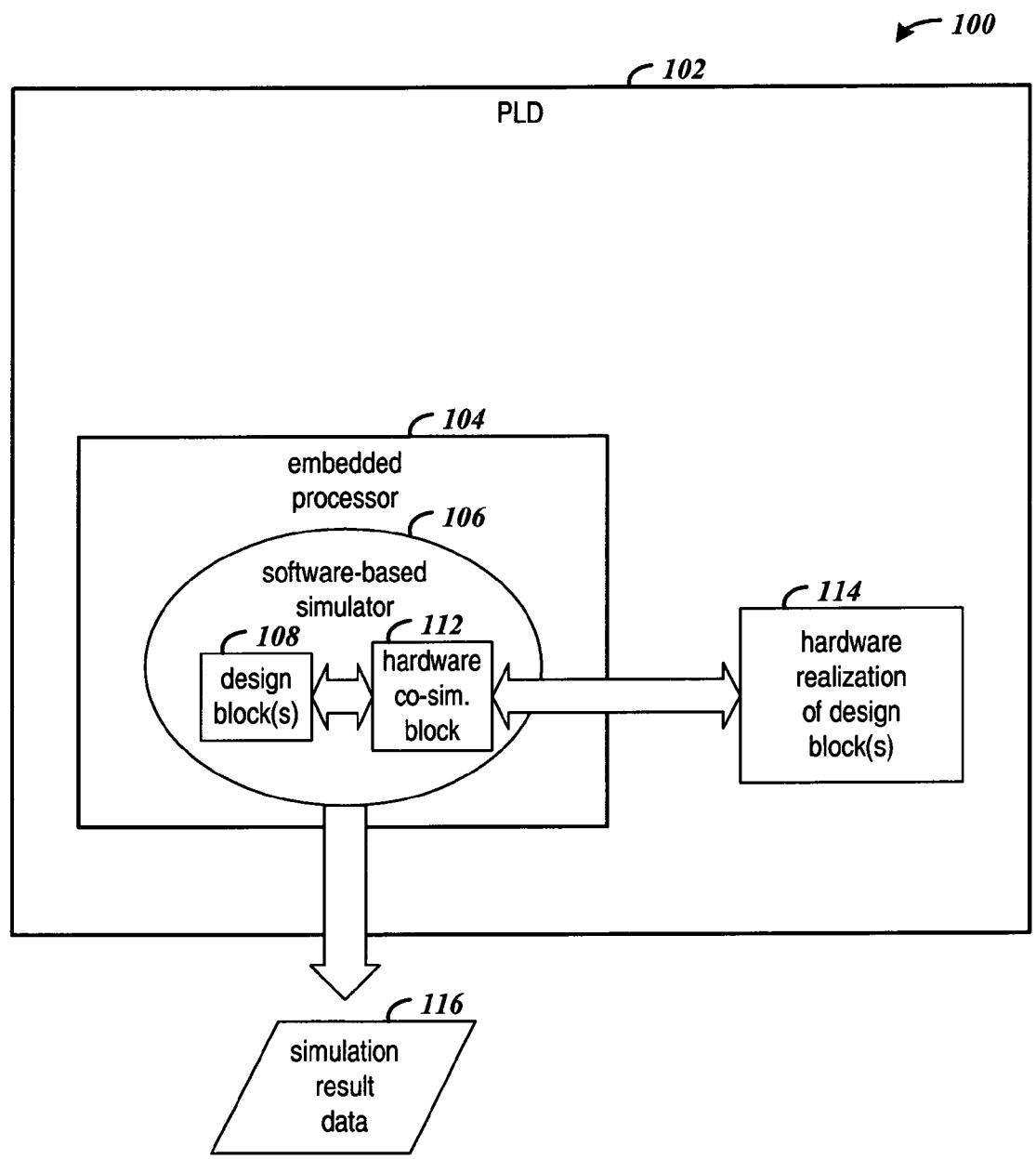
FIG. 1 is a block diagram that shows an example arrangement for co-simulation of a circuit design with an embedded processor and programmable logic resources of a programmable logic device (PLD) in accordance with one embodiment of the invention.

FIG. 1 is a block diagram that shows an example arrangement 100 for co-simulation of a circuit design with an embedded processor 104 and programmable logic resources of a programmable logic device (PLD) in accordance with one embodiment of the invention. The co-simulation arrangement 100 includes PLD 102 that has an embedded processor 104. A software-based simulator 106 executes on the embedded processor.

A portion, modeled as design block(s) 108, for example, of a circuit design is simulated using the software-based simulator 106, and another portion of the design is simulated using PLD logic resources. The portion of the design that is simulated using PLD logic resources is represented by blocks 112 and 114. Hardware co-simulation block 112 represents the portion of the design that is simulated using PLD logic resources and is used by the simulator 106 to interface with the hardware realization 114 of that portion of the design. The simulator 106 makes the simulation result data 116 available for analysis.

In one embodiment, the software-based simulator 106 may be an HLMS, such as the System Generator for DSP HLMS from Xilinx, executing on the embedded processor with an operating system or micro-kernel. The HLMS may be a special version having reduced functionality of the full version that normally executes on a workstation. The design block(s) 108 models the parts of the circuit design that are not compiled for hardware-based co-simulation on the PLD logic resources. For example, testbench blocks may be simulated in the software-based simulator 106.

In another embodiment, an HDL simulator (or a subset thereof), such as the Verilog HDL simulator or Saber HDL simulator, may be run on the embedded processor instead of an HLMS. In yet another embodiment, all design blocks not compiled for hardware simulation are compiled into code that executes on the embedded processor. This code does not require a simulator, an operating system, or a micro-kernel. For the processor to run and control the design block(s) 108, a code generator may be executed on a host workstation (not shown) to compile into code for execution on the embedded processor, that portion of the design desired for software-based simulation, along with compiling code for simulating and scheduling the simulation. A tool such as the Real-Time Workshop from the MathWorks, Inc., may be used to compile the software.

A hardware realization 114 of a design block (e.g., 114) may be generated when a design is compiled for hardware-based co-simulation, for example, with the System Generator for DSP HLMS. Along with the hardware realization, a hardware co-simulation block 112 is created. The hardware co-simulation block provides a port interface that matches the port interface of the corresponding block in the source design description. This permits the hardware co-simulation block to be substituted in place of the original design block During simulation, the hardware co-simulation block 112 controls the hardware realization 114. The various embodiments of the present invention reduce the overhead that other implementations of co-simulation arrangements introduce by way of function calls to a board interface layer. The board interface layer in these other implementations couple a host workstation, which hosts an HLMS performing software-based simulation, for example, to a hardware-based co-simulation engine. These function calls are made for opening and closing the hardware platform, managing data I/O, and controlling the hardware clock. These function calls in turn result in device driver calls for controlling the link from the workstation to the hardware platform. The interface provided in embodiments of the present invention eliminates much of this overhead.

Figure 5:
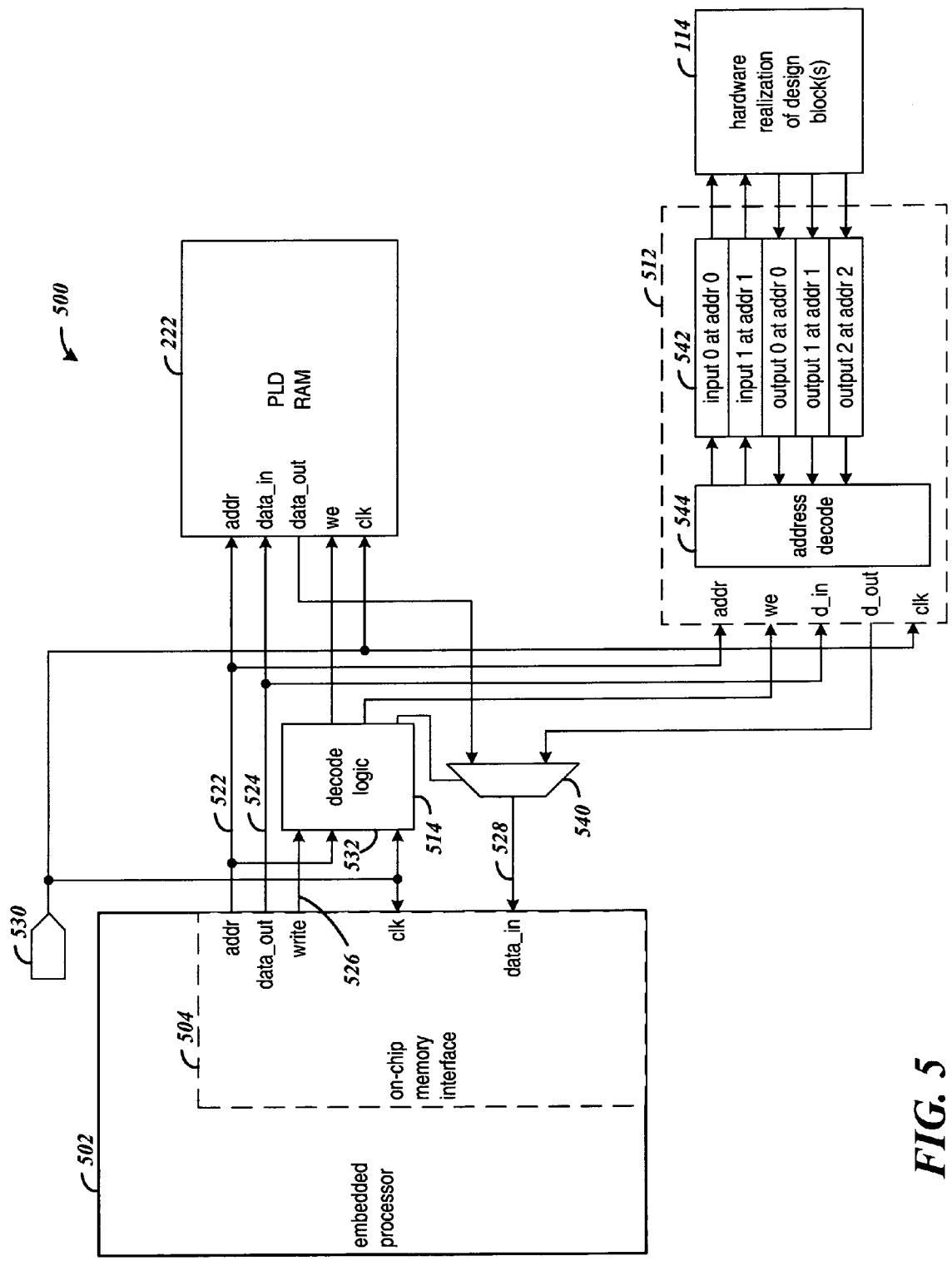
FIG. 5 is a block diagram that illustrates a circuit arrangement that provides an interface between a hardware realization of a design block and an embedded processor for co-simulation of a circuit design.

The interface between the software simulator and the hardware realization 114, according to one embodiment, is provided by a memory controller that is implemented as part of the embedded processor 104. For example, the PowerPC 405 logic core from IBM includes On-Chip Memory (OCM) controllers, which can be used to interface the software simulator to the hardware realization via a memory map interface (FIG. 5). The on-chip memory controller eliminates the need for more complicated processor interface buses, while also providing a high-speed, low-latency interface to the hardware portion of the design.

Simulation result data 116 are reported via addressable memory that is available in the PLD in accordance with various embodiments of the invention. For example, block RAM is available in Virtex FPGAs from Xilinx and may be used to buffer simulation results. The memory controller of the embedded processor that is used for interfacing to the hardware realization 114 may also be used to write simulation result data to the addressable memory on the PLD.

Figure 2:
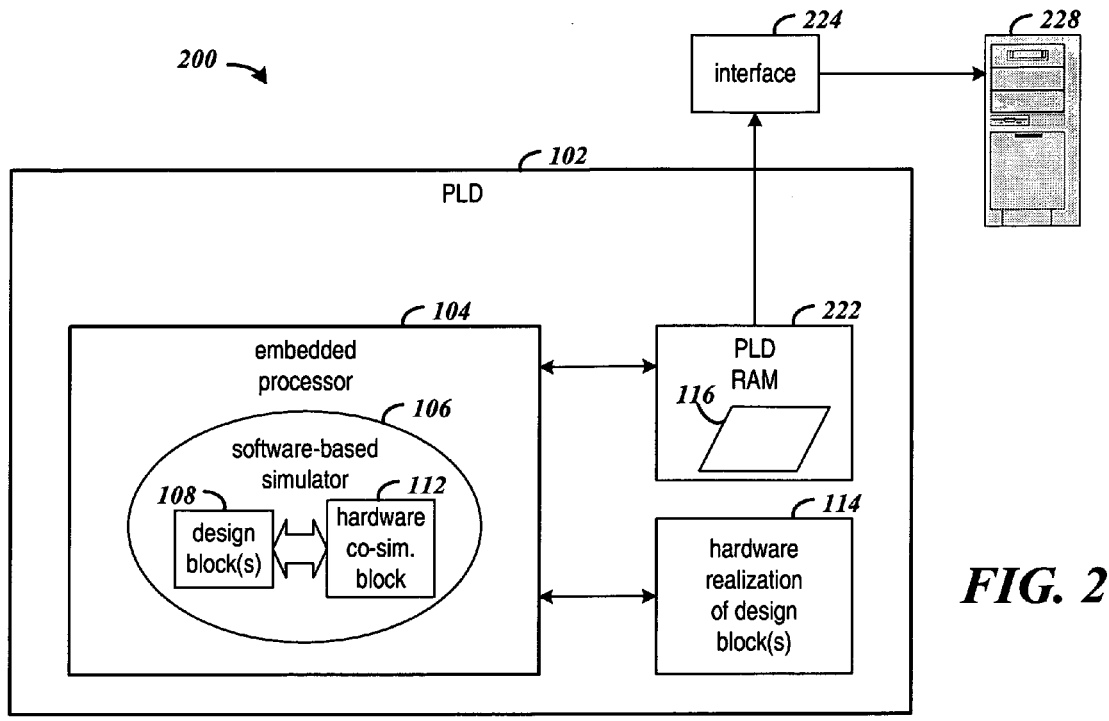
FIG. 2 is a block diagram of a co-simulation arrangement in which simulation result data 116 are buffered in on-device RAM of the PLD 102 and accessed by a tool coupled to the PLD, in accordance with one or more embodiments of the invention.

FIG. 2 is a block diagram of a co-simulation arrangement 200 in which simulation result data 116 are buffered in on-device RAM 222 of the PLD 102 and accessed by a tool coupled to the PLD, in accordance with one or more embodiments of the invention. As the software-based simulator accumulates simulation result data, the data 116 are written to the PLD RAM 222.

Workstation 228 may be used to host a tool for reading the simulation results 116 from PLD RAM 222 and displaying the results for a user. A link such as the Xilinx Parallel Cable IV link may be used as the interface 224 for connecting the workstation to the PLD 102.

Further manipulation of the data read from the PLD depends on the circuit design, user requirements, and capabilities of the tool. For example, the simulation result data may be read from the PLD and stored in retentive storage (not shown) in order to preserve the data for future analysis. The simulation data may also be displayed for visual inspection and/or automatically analyzed to determine whether the design behaved as expected in the simulation.

Figure 3:
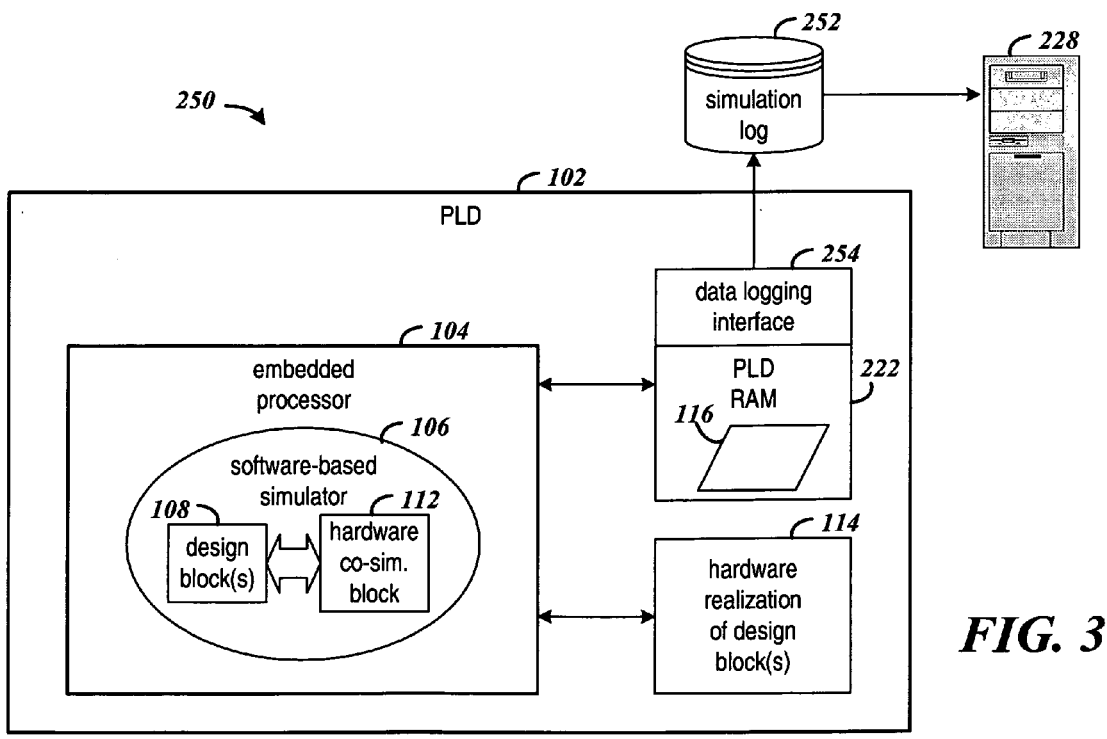
FIG. 3 is a block diagram of a co-simulation arrangement in which simulation results are buffered in on-device RAM of the PLD and logged to off-PLD storage in accordance with one or more embodiments of the invention.

FIG. 3 is a block diagram of a co-simulation arrangement 250 in which simulation results 116 are buffered in on-device RAM 222 of the PLD and logged to off-PLD storage 252, in accordance with one or more embodiments of the invention. As with the embodiment of FIG. 2, the software-based simulator accumulates simulation result data and writes the data 116 to the PLD RAM 222. In arrangement 250, a data logging interface 254 reads simulation result data 116 from the PLD RAM 222 and writes the data as a simulation log in retentive storage 252. The retentive storage may be any medium suitable for long term storage of result data. For example, magnetic media or flash memory media may be suitable depending on user requirements. The data logging interface 254 implemented on the PLD eliminates the need for interface 224 to access the simulation result data as in the arrangement 200 in FIG. 2.

Figure 4:
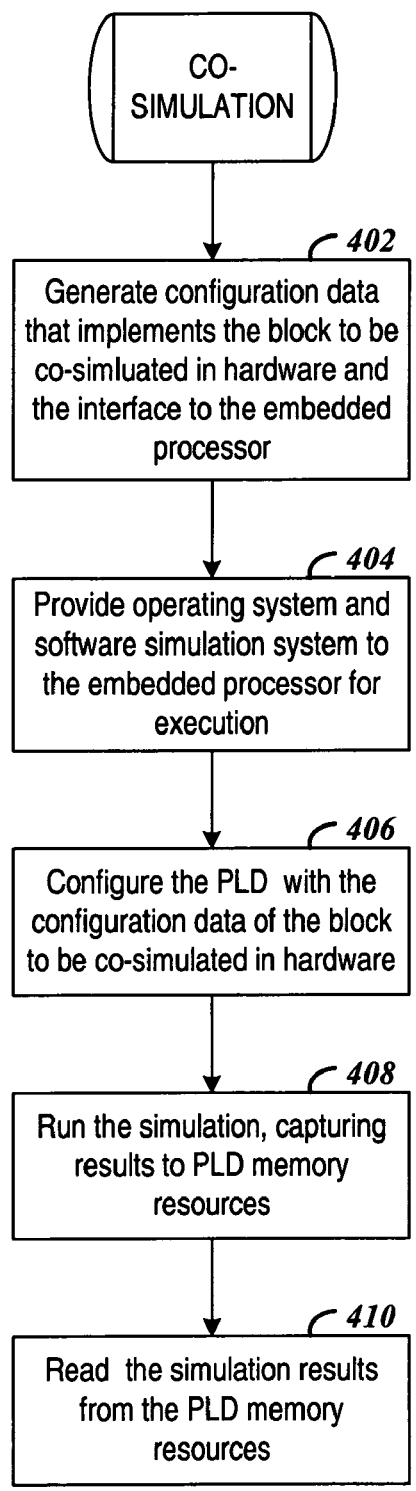
FIG. 4 is a flow chart of an example process for co-simulation of a design with an embedded processor and programmable logic resources of a PLD in accordance with one or more embodiments of the invention.

FIG. 4 is a flow chart of an example process for co-simulation of a design with an embedded processor and programmable logic resources of a PLD in accordance with one or more embodiments of the invention. At step 402, the configuration data is generated to implement the block to be co-simulated in hardware and also to implement the interface between the hardware realization of the block and the embedded processor. In an example implementation, an HLMS such as the System Generator system may be used to generate a hardware implementation of a part of a design to be co-simulated on a hardware platform. The generator may also prepare a proxy component that is used in the software simulator as the interface to the hardware realization, such as that described in the co-pending U.S. patent application Ser. No. 10/850,178 entitled, "EMBEDDING A CO-SIMULATED HARDWARE OBJECT IN AN EVENT-DRIVEN SIMULATOR", by Ballagh et al., filed on May 20, 2004, and assigned to the assignee of the present application, the contents of which are incorporated herein by reference.

The software simulation system and the underlying operating system are installed for execution on the embedded processor at step 404. As explained above, a code generator may be used to compile into code for execution on the embedded processor, that portion of the design desired for software-based simulation, along with compiling code for simulating and scheduling the simulation. It will be appreciated that the software simulator may include routines for providing input data to and obtaining output data from the hardware realization of the design block. The instruction store for the embedded processor may be implemented using block RAM (inside the PLD), or using external memory (outside the PLD) if the hardware platform provides it.

At step 406, the PLD is configured with the configuration data using any tool that is suitable for PLD configuration. The simulation is run at step 408. The software-based simulator is executed on the embedded processor, and the hardware realization is activated under control of the software-based simulator. In running the simulation at step 408, the simulation results are temporarily written to PLD memory resources via a memory map interface (see FIG. 5), for example. The simulation result data may then be read from the PLD memory at step 410 and further processed as desired.

FIG. 5 is a block diagram that illustrates a circuit arrangement 500 that provides an interface between a hardware realization 114 of a design block and an embedded processor 502 for co-simulation of a circuit design. The embedded processor 502 includes an on-chip memory interface 504, which provides an interface for communicating with the PLD RAM 222 and the hardware realization 114 of a design block. The memory map interface 512 is coupled between the on-chip memory interface 504 and the hardware realization 114 for providing an addressable memory space for the exchange of data and control signals between the embedded processor and the hardware realization.

The on-chip memory interface 504 includes ports for an address bus, output data bus, output write signal, input clock signal, and input data bus. An address is output on line 522 and specifies an address to which data is to be written. Data is output on line 524. The write signal on line 526 indicates availability of data to write, and input data to the embedded processor is provided on line 528. PLD RAM 222 includes corresponding ports for receiving an address, input data, a write-enable signal, and a clock signal. The on-chip memory interface may have additional ports depending on the interface implementation and application requirements.

The clock source 530 provides the clock signal to the embedded processor 502, decode logic 532, PLD RAM 222, and memory map interface 512.

Decode logic 532 controls the write enable signals to the PLD RAM 222 and to the memory map circuit 512 and provides a control signal that selects input data to the on-chip memory interface via multiplexer 540 in response to the address and write signal from the on-chip memory interface and the input clock signal.

The memory map interface 512 reserves a portion of addressable memory in the PLD for storage of input and output values for the realization of the design block. Elements 542 of the memory map correspond to I/O ports on the implemented design block. Via the on-chip memory interface, the simulator control functions executing on the processor read data from and write data to specific ports on the realization of the specialized hardware object by generating an address that the address decode logic 544 decodes. The address may be computed by using the index of a port to generate an address offset that references one of elements 542.

In an example embodiment, the memory map interface is allocated a range of addresses. This allows software code to access memory map locations simply by writing/reading from designated memory addresses (e.g., using pointers). Using the on-chip memory interface eliminates the need for a device driver and external communication link, thereby significantly reducing the amount of overhead associated with a transaction with the hardware portion of the design.

The present invention is believed to be applicable to a variety of systems for co-simulation and is thought to be particularly applicable and beneficial in co-simulation using an FPGA having an embedded processor. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for co-simulating an electronic circuit design, comprising:

performing hardware-based co-simulation of a first portion of the electronic circuit design on programmed logic resources of a programmable logic device (PLD) that includes an embedded processor;

performing software-based co-simulation of a second portion of the electronic circuit design on the embedded processor;

buffering simulation output data in addressable memory on the PLD;

reading the simulation output data from the addressable memory on the PLD by a circuit implemented on the PLD; and writing the simulation output data to off-PLD storage by the circuit implemented on the PLD.

2. The method of claim 1, wherein the embedded processor includes a memory interface circuit and the method further comprising:

configuring the PLD with a memory map interface coupled to the memory interface circuit and coupled to the PLD resources that co-simulate the first portion of the electronic circuit design;

addressing the memory map interface by the memory interface circuit in response to transfer of simulation data between the software-based co-simulation and the hardware-based co-simulation; and addressing the PLD addressable memory by the memory interface circuit in response to simulation results output by the software-based co-simulation of the second portion of the electronic circuit design.

3. The method of claim 1, wherein the step of performing software-based co-simulation includes executing a high-level modeling system on the embedded processor.

4. The method of claim 3, further comprising:

generating a hardware co-simulation block representing the first portion of the design and a PLD implementation of the first portion of the design;

configuring the PLD with the PLD implementation of the first portion of the design;

instantiating the hardware co-simulation block for software-based co-simulation; and communicating simulation data between the second portion of the electronic circuit design and the PLD implementation of the first portion configured in the PLD via the hardware co-simulation block.

5. The method of claim 1, wherein the embedded processor includes a memory interface circuit and the method further comprising:

configuring the PLD with a memory map interface coupled to the memory interface circuit and coupled to the PLD resources that co-simulate the first portion of the electronic circuit design;

addressing the memory map interface by the memory interface circuit in response to transfer of simulation data between the software-based co-simulation and the hardware-based co-simulation; and addressing the PLD addressable memory by the memory interface circuit in response to simulation results output by the software-based co-simulation of the second portion of the electronic circuit design.

6. The method of claim 1, wherein the step of performing software-based co-simulation includes executing a hardware definition language (HDL) simulator on the embedded processor.

7. An apparatus for co-simulating an electronic circuit design, comprising:

means for performing hardware-based co-simulation of a first portion of the electronic circuit design on programmed logic resources of a programmable logic device (PLD) that includes an embedded processor;

means for performing software-based co-simulation of a second portion of the electronic circuit design on the embedded processor;

means for buffering simulation output data in addressable memory on the PLD;

means for reading the simulation output data from the addressable memory on the PLD by a circuit implemented on the PLD; and means for writing the simulation output data to off-PLD storage by the circuit implemented on the PLD.

8. A simulation system for co-simulating an electronic circuit design, comprising:

a plurality of programmable logic resources in a programmable logic device (PLD), the plurality of programmable logic resources programmed for hardware-based co-simulation of a first portion of the electronic circuit design;

an embedded processor in the PLD coupled to the programmable logic resources programmed to co-simulate the first portion of the circuit design, the embedded processor configured to perform software-based co-simulation of a second portion of the electronic circuit design;

addressable memory embedded in the PLD and coupled to the embedded processor, the embedded processor further configured to write simulation output data in the addressable memory; and a logging interface implemented on the plurality of programmable logic resources of the PLD and coupled to the addressable memory, the logging interface configured to read simulation output data from the addressable memory on the PLD and output the simulation output from the PLD.

9. The simulation system of claim 8, further comprising:

a memory interface circuit coupled to the embedded processor and to the addressable memory;

a memory map interface implemented on programmable logic resources of the PLD and coupled to the addressable memory and to the memory interface of the embedded processor;

wherein the memory interface circuit addresses the memory map interface in response to transfer of simulation data between the embedded processor and the plurality of PLD resources programmed for hardware-based co-simulation of the first portion of the circuit design, and addresses the addressable memory in response to simulation results output by the embedded processor.

10. The simulation system of claim 8, wherein the embedded processor is configured with a high-level modeling system for performing software-based co-simulation.

11. The simulation system of claim 8, wherein the embedded processor is configured with a hardware definition language (HDL) simulator for performing software-based co-simulation.

* * * * *